Nov. 16, 1965  J. M. WILLIAMSON  3,217,541
REMOTE READING GAUGE
Filed Sept. 20, 1963
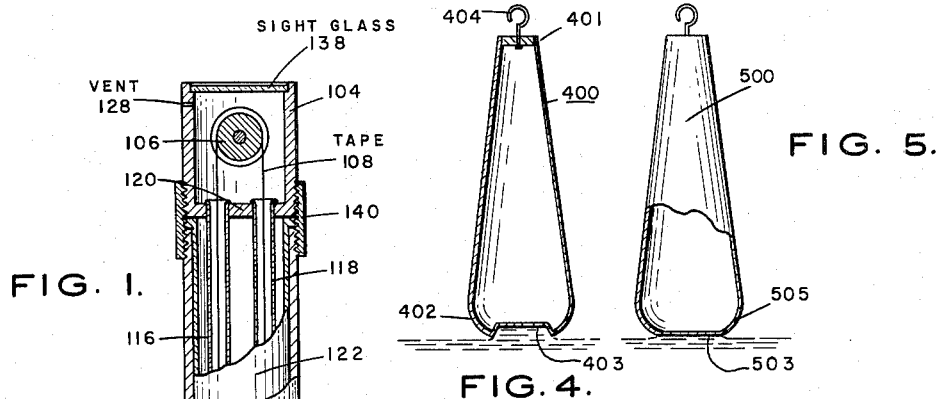
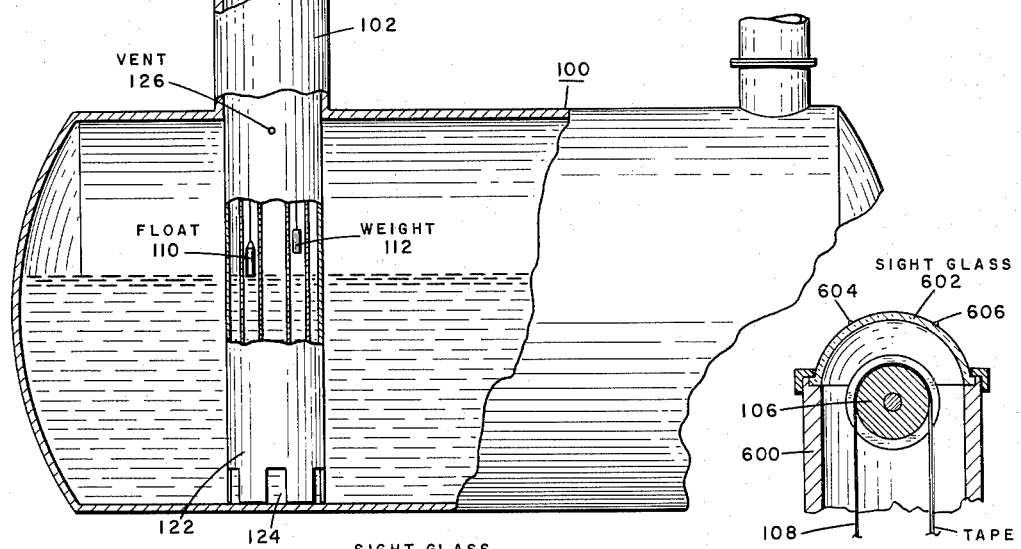
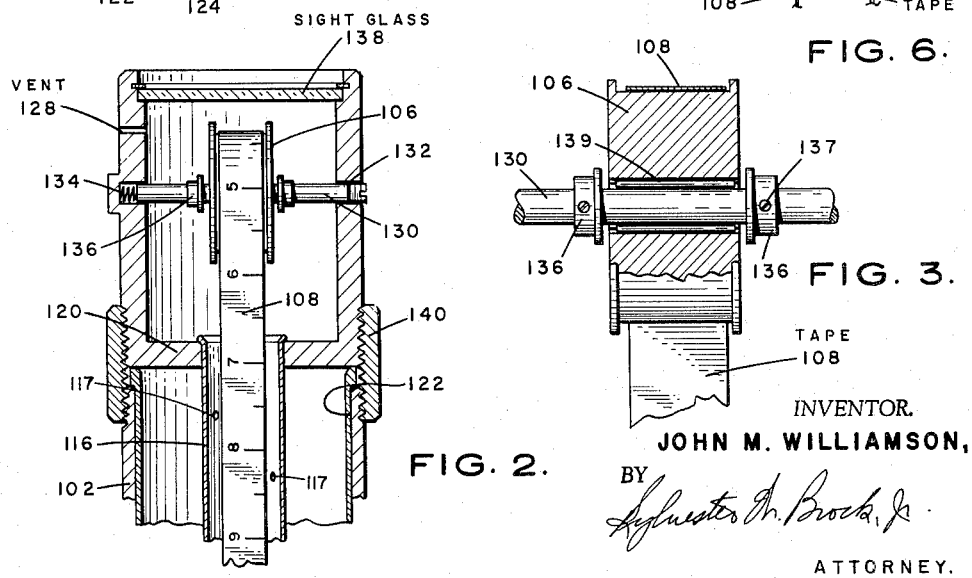
INVENTOR.
JOHN M. WILLIAMSON,
ATTORNEY.

United States Patent Office 3,217,541
Patented Nov. 16, 1965

3,217,541
REMOTE READING GAUGE
John M. Williamson, 8953 Katy Road, Houston 55, Tex.
Filed Sept. 20, 1963, Ser. No. 310,246
6 Claims. (Cl. 73—321)

The present invention relates to a remote reading gauge for determining liquid level and a method of determining such a liquid level. More specifically, the present invention relates to a remote reading gauge for use in determining liquid level within a tank, and a method for determining such level whereby the effect of surface turbulence on the float and connecting tape is minimized.

The volume of liquid within a storage tank is commonly obtained by inserting a graduated rod into the tank and reading the highest point which has become wetted by such insertion. The depth of liquid thus indicated is compared with so-called "strapping tables" which relate the depth of liquid within the tank to the volume of liquid contained at that degree of fullness. This is unsatisfactory inasmuch as the rod cannot be inserted in a completely vertical position every time, and the reproducibility of results is very poor. The operator does not have an accurate picture of the liquid level and, therefore, the use of rods and strapping tables is considered to be an unreliable method of obtaining the liquid volume. This unreliability is avoided by the present invention.

Prior art float systems have suffered from the effect of surface turbulence, particularly during filling operations, and from the effect of float settling due to changes in the effective weight of the tape.

By the present invention a low friction, low inertia system is provided wherein a low-weight graduated tape is connected to a float and to a counterweight on its free ends, and is frictionally looped over a tape wheel. The graduated tape is then compared against a reading point to obtain the liquid level reading.

In order to minimize the effects of the tape weight in causing the float to vary its buoyant force, the tape which is utilized has a very low weight as compared to the volume of the float. For example, where the float has a cross-sectional area of 0.8 to 1.2 square inches, the tape may weigh about 8½ ounces. In a 5-foot diameter tank having a 4-foot standpipe, the maximum effective weight of the tape in effecting the buoyancy of the float would be only about 4 ounces and an average effective weight of only 2 ounces. Thus, in a fluid having a specific gravity of 1.0, for example, the float would sink only about ½ inch for a cross-sectional area of 2 square inches, only ¼ inch error would be involved. This maximum deflection will occur at the top and bottom of the tank, respectively, where the volumetric error is minimized. By providing a fairly large cross-sectional area of the float and a high density, low volume counterweight, the variations in tape reading due to the float level are therefore minimized.

Another aspect of the present invention relates to the provision of guides for the float and for the counterweight which are enclosed within a tubular shielding means which minimizes the effects of surface turbulence by completely shielding the float, counterweight, and tape from the effects of surface turbulence.

Another aspect of the present invention involves the use of a float having a flat or concave lower surface so that as the liquid level falls within the tank, the surface tension of the fluid becomes operative to draw the float down with the flat or concave surface initially at the liquid level. Thus, during the critical emptying portion of the tank cycle, a very high degree of accuracy in reading the tape is obtained.

All of this is more easily understood by reference to the drawings, wherein:

FIG. 1 is a sectional elevation view of a storage tank with the present invention installed therein;

FIG. 2 is a sectional view of the gauge case structure of the present invention;

FIG. 3 is a cross section of the tape wheel;

FIG. 4 is a sectional elevation of a concave-faced float;

FIG. 5 is a sectional elevation having a flat lower surface; and

FIG. 6 is a modified sectional gauge case in accordance with the present invention wherein the sight glass is in the form of a semicylindrical, transparent cap having two gauge marks.

Referring now to FIG. 1, the present invention is seen installed on a tank 100 by means of a standpipe 102. The gauge is seen to comprise a gauge case 104 with a rotatable tape wheel 106 horizontally disposed within the gauge case, with a flexible tape 108 frictionally engaging the tape wheel and depending vertically on either side thereof, float means 110 attached to one free end of the tape, and counterweight means 112 attached to the other free end thereof. Tubular guide means 116 and 118 are provided for the float and counterweight respectively, and depend from the gauge case by means of tube-sheet 120. A tubular shielding means 122 is provided which encloses the tubular guide means 116 and 118, and is suitably inserted through the standpipe 102 so as to rest closely against the interior walls thereof. The tubular shielding means stands upon the bottom of the tank and is provided at the bottom thereof with a plurality of fluid passages 124 through which the liquid may enter within the shielding means and the tubular guide means. Alternatively, the shielding means can be made of perforated sheet metal or screen so chosen that the foramen are small enough to prevent surface turbulence from affecting the float. The tubular guide means 116 and 118 are suitably provided with a number of perforations vertically disposed in order to allow free movement of fluid therewithin, but are protected by the shielding means 122 from surface turbulence. The shielding means 122 is provided with a breather hole 126 near the upper portion of the tank so as to prevent vapor lock thereof. This breather hole may alternatively be provided by a perforation in one of the guide means near the gauge case. The gauge case itself is provided with a breather hole 128 in order to prevent vapor lock within the guide tubes 116 and 118.

FIG. 2 shows on a larger scale the construction of the gauge case 104 wherein the tape wheel 106 is shown mounted on a substantially horizontal shaft 130 which extends through an opening 132 in the gauge case wall and is spring-mounted within a recess 134 in the opposite wall of the gauge case. The shaft 130 is provided with keeper means 136 on either side of the guide wheel. The shielding means 122 is clearly shown in FIG. 2 to closely follow the interior wall of the standpipe 102 and to be secured in position by the collar 140 which also secures the gauge case 104 in position. The tubular guide means 116 is seen to be provided throughout its length with foramen 117, and is attached to the tubesheet 120 by being rolled into position. It is to be understood that if desired, the shielding means 122 can be rigidly affixed to the gauge case 104. The gauge case is also seen to comprise a sight glass 138 which may be provided with sight marks against which the graduated tape can be compared for level measurement.

Referring now to FIG. 3, the tape wheel 106 is seen to be mounted on the substantially horizontal shaft 130 by keeper means 136, which are provided with set screws 137 for maintaining them in position. The tape wheel 106 is rotatably mounted in the shaft 130 by low friction bearing means such as roller bearings 139. Needle bearings or ball bearings are also suitable and are generically included within the term "roller bearing means."

Referring now to FIG. 4, a preferred type of float is shown which comprises a frustoconical body 400 having a minor end 401 and a major end 402. A concavity 403 is formed at the lower reaches of the major end, and mounting means 404 are provided at the minor end. The cross-sectional area defined by the concavity is suitably from 1 to 3 square inches where the float is to be used inside a 1½ to 2-inch inside diameter tube.

In FIG. 5 is shown another modification of the preferred float wherein the frustoconical body 500 is provided with a flat surface 503 rather than a concave surface as in FIG. 4. The major end is provided with a rounded portion 505 which serves to maintain the float in spaced relation from the tubular guide wall so as to minimize the meniscus effect which would be suffered in a straight conical body with a flat or concave undersurface.

Referring now to FIG. 6, a modification of the gauge case is shown wherein a semicylindrical viewplate 602 is shown on a gauge case 600 provided with marks 604 and 606. As will be understood by a discussion of the preferred method hereinafter set forth, the present invention may rely upon the buoyant effect for obtaining a surface reading while the tank is being filled, and upon the surface tension effect for obtaining a reading while the tank is being emptied. In order to make a more accurate determination of the liquid level, a separate reading mark may be scribed on the viewplate for use during each operation.

Turning now to the preferred method of operation of the present invention, the apparatus shown in FIGS. 1–4 is provided with a float such as shown in FIG. 4 which weighs substantially the same as or slightly heavier than the counterweight, and the tape being used weighs from ⅓ to ⅔ as much as the float means. The size of the perimeter of the concavity in the float means is sized so that the surface tension of the liquid being measured is sufficient to overcome the frictional inertia of the tape wheel and the weight of the tape and counterweight while the system is at the maximum tank level. The effective weight of the tape and counterweight less their buoyant effect is included in a computation of the force to be overcome by the surface tension of the fluid in its interaction with the float. As the liquid level drops, the surface tension acts upon the float so as to draw the float down with the lower extremity essentially at the surface level. When withdrawal of liquid is stopped, the float remains at rest in this position. At all times the reading of the graduated tape gives an accurate determination of liquid level within the tank.

Assuming that fluid is being introduced into the tank when it is substantially empty (the most rigorous case), the buoyant effect of the float must be such as to overcome its own weight and the weight of the tape hanging within the float guide tube, plus the frictional inertia of the guide wheel less the counterbalancing effect of the weight of the counterweight and the tape within the counterweight guide. In order to minimize the variations between the readings obtained while liquid is being withdrawn and those obtained while liquid is being introduced into the tank, the float is provided with a cross-sectional area at its larger end, which is quite large with respect to the volume of fluid which must be displaced in order to counteract the effect of added weight. At about the midpoint of the tank, the effective tape weight will be essentially zero, and this is the area wherein a small vertical variation has a large volumetric significance. Thus, accurate readings can be obtained even though the float depends upon buoyancy during the filling operation.

Briefly, then, the method of the invention can be stated to comprise determining the liquid level within a tank by positioning a float having a flat or concave surface at the liquid interface, applying an upward force to said float, said force being less than the combined reactive force of the float weight and the effective surface tension of the liquid, so that the bottom face of the float rides substantially at the surface of the liquid, and measuring the distance from the concave face of the float to a given reference point. By moving a graduated tape which is marked to indicate the distance of each graduation from the bottom surface of the float, this distance (and therefore the position of the liquid surface) can easily be determined.

As an example, in a 10-foot diameter underground storage tank, the gauge may be provided with a shield pipe having a 4-inch diameter, with 1½-inch diameter tubing used as tube guides. A 1¼-inch diameter float can be used with a lead counterweight weighing ½ pound and a 5-ounce tape. The float in this instance would weigh ½ pound with perhaps ¼ ounce added weight. The float would then have a major axis of about 5 inches, with the concavity in the bottom face from ⅛ to ¼ inch deep and about ¾ of an inch to 1 inch in diameter. The float may be rounded off from the outer periphery of the concavity to the maximum diameter of 1¼ inches to within about ¼ inch to ½ inch of the bottom in order to minimize the meniscus effect at the tube walls.

Having disclosed the invention and a preferred embodiment thereof, what is to be claimed by Letters Patent should be limited not by the specific examples herein given but by the appended claims.

I claim:

1. A remote reading liquid level gauge which comprises
a vertically disposed cylindrical gauge case having an integral horizontal tubesheet at the lower end thereof and a transparent sight glass at the upper end thereof,
first tubular guide means extending through and depending from said tubesheet,
second tubular guide means extending through and depending from said tubesheet,
stationary shaft means depending from said gauge case, extending horizontally thereacross mediate said first and second tubular guide means and normal to the line connecting the centerlines thereof,
a tape wheel rotatably mounted on said shaft means by roller bearing means,
keeper means affixed to said shaft on each side of said tape wheel,
foraminous shield means enclosing said tubular guide means,
counterweight means in said first tubular guide means,
float means in said second tubular guide means, said float means being from 0.5% to 2% heavier than said counterweight and having a cross-sectional area great enough to account for the displacement of the weight, and comprising a frustoconical body having a minor end and a major end, said major end having a concavity formed therein and said minor end having mounting means attached thereto, and
a graduated tape in looped engagement with said tape wheel and having a first end extending into said first tubular guide means and attached to said counterweight, and a second end extending into said second tubular guide means and attached to said mounting means of said float means.

2. Apparatus in accordance with claim 1 wherein said transparent sight glass is formed as a cylindrical body substantially concentric with said tape wheel, and wherein two angularly spaced reference marks are affixed to said sight glass.

3. A remote reading liquid level gauge which comprises
   a gauge case having a tubesheet extending thereacross,
   rotatable tape wheel means disposed within said gauge case for rotation about a horizontal axis above said tubesheet,
   a flexible tape adapted for frictionally engaging said tape wheel means and for depending vertically on either side thereof,
   float means attached to said tape at one free end thereof,
   counterweight means attached to said tape at the other end thereof,
   tubular float guide means depending from and extending below said tubesheet and adapted to enclose said float means,
   tubular counterweight guide means, laterally spaced from and parallel to said float guide means, depending from and extending below said tubesheet and adapted to enclose said counterweight means,
   said float guide means and said counterweight guide means being foraminous throughout substantially the entire lengths thereof, and
   imperforate tubular shielding means having a tubular body adapted to enclose said float guide means and said counterweight guide means throughout substantially the entire lengths thereof,
   said shielding means having fluid passages only at the end remote from said gauge case.

4. Apparatus in accordance with claim 3 wherein said float means comprises a concave face remote from said tape.

5. Apparatus in accordance with claim 3 wherein said tape weighs from ⅓ to ⅔ as much as said float means.

6. Apparatus in accordance with claim 3 wherein said float means comprises a concave face remote from said tape, said tape weighs from ⅓ to ⅔ as much as said float means, and said float means and said counterweight means are of substantially the same weight.

References Cited by the Examiner
UNITED STATES PATENTS

| | | | |
|---|---|---|---|
| 980,348 | 1/1911 | Scurlock | 73—321 |
| 1,133,013 | 3/1915 | Eberhart | 73—313 |
| 1,767,641 | 6/1930 | Anschicks | 73—321 |
| 2,282,774 | 5/1942 | Wiggins | 33—126.5 |
| 2,296,812 | 9/1942 | Dickason | 73—321 |
| 2,510,663 | 6/1950 | Schuessler | 73—322 X |
| 2,564,676 | 8/1951 | Crouse | 73—320 |
| 3,081,547 | 3/1963 | Yarnall | 33—126.5 |

FOREIGN PATENTS

| | | |
|---|---|---|
| 433,321 | 7/1947 | Italy. |

ISAAC LISANN, *Primary Examiner.*